(12) United States Patent
Suzuki et al.

(10) Patent No.: US 6,389,807 B1
(45) Date of Patent: May 21, 2002

(54) CONTROL APPARATUS AND CONTROL METHOD FOR MOTOR VEHICLE

(75) Inventors: Naoto Suzuki, Fujinomiya; Toshifumi Takaoka; Takashi Suzuki, both of Susono; Daimon Okada, Ikeda, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/713,213

(22) Filed: Nov. 16, 2000

(30) Foreign Application Priority Data

Dec. 6, 1999 (JP) ............................................. 11-345928

(51) Int. Cl.⁷ ................................................ F01N 3/00
(52) U.S. Cl. ............................ 60/285; 60/274; 60/277; 180/65.3
(58) Field of Search .......................... 60/274, 285, 276, 60/277, 284; 180/65.2, 65.3, 65.4; 123/90.15, 90.19; 701/103, 109

(56) References Cited

U.S. PATENT DOCUMENTS 5,323,868 A * 6/1994 Kawashima ................ 180/65.4
5,566,774 A * 10/1996 Yoshida ..................... 180/65.4
5,609,218 A * 3/1997 Yamashita et al. .......... 180/197
6,059,057 A * 5/2000 Yamashita et al. ......... 180/65.2
6,073,440 A * 6/2000 Douta et al. .................... 60/277
6,173,569 B1 * 1/2001 Kusada et al. ................ 60/277
6,220,019 B1 * 4/2001 Sugiura et al. ............... 60/285

FOREIGN PATENT DOCUMENTS

| JP | A-9-284916 | 10/1997 |
| JP | A-11-93723 | 4/1999 |

* cited by examiner

Primary Examiner—Thomas Denion
Assistant Examiner—Binh Tran
(74) Attorney, Agent, or Firm—Oliff & Berridge PLC (57) ABSTRACT

A control apparatus for a motor vehicle detects a catalyst temperature during fuel cut. If the catalyst temperature is higher than a predetermined temperature, the control apparatus almost completely opens a throttle valve and increases an amount of intake air to thereby reduce pumping loss. If the catalyst temperature is equal to or lower than the predetermined temperature, the throttle valve is almost completely closed. Thereby it becomes possible to reduce pumping loss of the engine while preventing an excessive decrease in catalyst temperature.

20 Claims, 5 Drawing Sheets

CONTROL APPARATUS AND CONTROL METHOD FOR MOTOR VEHICLE

The disclosure of Japanese Patent Application No. 11-345928 filed on Dec. 6, 1999 including the specification, drawings and abstract is incorporated herein by reference in its entirety.

BACKGROUND OF THE INVENTION

1. Field of the Invention

The invention relates to a control apparatus and method wherein supply of fuel to an engine may be stopped even in a traveling state of the vehicle.

2. Description of the Related Art

As a drive source for driving a vehicle, a hybrid vehicle equipped with an engine and a motor having a regenerative function is known from Japanese Patent Application Laid-Open No. 5-229351. In such a vehicle, with a view to improving fuel consumption, supply of fuel to an engine is stopped (fuel cut) during deceleration of the vehicle.

During deceleration, a throttle valve (a valve for adjusting an amount of intake air) is generally completely closed. Thus, if supply of fuel to the engine is stopped in this state, pistons in the engine reciprocate within an enclosed space. Reciprocating movement of the pistons offers resistance against the traveling of the vehicle. As a result, regenerative efficiency of the motor decreases and fuel consumption deteriorates. This problem arises especially in a vehicle constructed such that rotation of an engine continues during the traveling of the vehicle even if fuel supply has been stopped. Even in a vehicle constructed such that an engine can be stopped independently of the traveling of the vehicle, a similar problem arises from a timing when fuel supply is stopped to a timing when the engine is actually controlled to be stopped.

Japanese Patent Application Laid-Open No. 9-284916 discloses that outside air can be introduced by completely opening a throttle valve if supply of fuel is stopped during deceleration (regeneration) of a hybrid vehicle and wherein pumping loss of the engine is thereby reduced to the extent of improving fuel consumption. However, since the throttle valve is completely opened, a large amount of cold outside air flows into the exhaust system through the engine. Therefore, the temperature of a catalyst provided in the exhaust system decreases and causes a problem of an increase in concentrations of exhaust emission substances.

In order to solve this problem, Japanese Patent Application Laid-Open No. 11-93723 discloses that a throttle valve is almost completely opened and an exhaust gas recirculation control valve (an EGR valve) is completely opened at the same time. However, this solution can only be applied to a vehicle employing an exhaust gas recirculation control (EGR control) system, and others are simply designed to prevent cold outside air from entering an exhaust system. Thus, when the exhaust system is sufficiently warm, for example, immediately after long-term operation accompanied by fuel supply, or when outside air to be introduced is at a high temperature because of the summer season, flow of air may be excessively restricted in connection with pumping loss. The art mentioned above does not provide an effective countermeasure.

SUMMARY OF THE INVENTION

The invention solves the problems described above. According to an exemplary embodiment of the invention, a control apparatus for a motor vehicle can reliably prevent concentrations of exhaust emission substances from increasing due to a decrease in temperature of a catalyst in an exhaust system while minimizing pumping loss of an engine.

A control apparatus for a motor vehicle according to a first exemplary embodiment of the invention is constructed such that supply of fuel to an engine can be stopped even when the vehicle speed is not equal to zero. The control apparatus includes a fuel supply detector that detects whether or not supply of fuel to an engine has been stopped during a traveling state of the vehicle, a temperature detector that detects a temperature of a catalyst in an exhaust system, and a controller that restricts flow of outside air into the exhaust system if it is detected that fuel supply in the vehicle has been stopped and that the temperature of the catalyst in the exhaust system is equal to or lower than a predetermined temperature and that causes outside air to flow into the exhaust system if it is detected that fuel supply in the vehicle has been stopped and the catalyst temperature is higher than the predetermined temperature.

According to the first exemplary embodiment, when the temperature of the catalyst in the exhaust system is low, flow of outside air into the exhaust system is restricted to prevent an increase in concentrations of exhaust emission substances. On the other hand, when the catalyst temperature is high, outside air is caused to flow into the exhaust system. Thereby it becomes possible to reduce pumping loss of the engine without adversely affecting concentrations of exhaust emission substances.

Although the catalyst temperature may directly be detected, it may also be detected indirectly by detecting a temperature of a specific portion of the exhaust system.

The invention may be constructed such that an amount of intake air in the engine is increased, for example, if it is detected that fuel supply in the vehicle has been stopped and that the temperature of the catalyst in the exhaust system is equal to or higher than a predetermined temperature.

According to this construction, the amount of intake air is increased during stop of fuel supply (even if the accelerator pedal is completely closed). Therefore, air is allowed to flow around pistons of the engine, and pumping loss can be reduced correspondingly. Consequently, it becomes possible to improve fuel consumption and regenerative efficiency.

If it is detected that the catalyst temperature has become equal to or lower than a predetermined temperature, the increase in amount of intake air is stopped. Thus, even if the catalyst has been cooled through introduction of outside air, the temperature does not decrease to the extent of hampering the catalytic function. Therefore, it is possible to prevent an increase in concentrations of exhaust emission substances. In other words, since the maximum amount of intake air can be increased based on an actual temperature of the catalyst as long as the catalytic function is not hampered, it is possible to prevent both deterioration of the catalytic function and an increase of pumping loss.

Alternatively, it is possible to adopt a construction wherein the amount of intake air is increased in accordance with a temperature of the catalyst in the exhaust system if fuel supply in the vehicle has been stopped.

According to this construction, since the amount of intake air is increased depending on an actual temperature of the catalyst in the exhaust system, it is possible to more precisely realize both reduction of concentrations of exhaust emission substances of the engine and reduction of pumping loss.

The methods by which the amount of intake air is increased in accordance with an actual temperature of the catalyst may include adjusting the ratio between an open-period and a closed-period of the throttle valve for adjusting an amount of intake air depending on a temperature of the catalyst in the exhaust system or maintaining the throttle valve at a predetermined opening degree depending on a temperature of the catalyst in the throttle valve. In the latter method, wherein the throttle valve is maintained at a predetermined opening degree, there is no abrupt change in friction. Thus, the latter method is advantageous in that there is no possibility of a shock or the like being generated.

Furthermore, it is also possible to adopt a construction wherein if it is detected that fuel supply in the vehicle has been stopped, the amount of intake air in the engine is increased and exhaust valves are driven in their closing directions in accordance with a temperature of the catalyst in the exhaust system.

In this construction, while reducing pumping loss of the engine by increasing an amount of intake air in the engine, the exhaust valves of the engine are kept closed in accordance with a temperature of the catalyst in the exhaust system so as to prevent cold outside air from entering the exhaust system due to an increase in amount of intake air. Therefore, it is possible to minimize pumping loss and reliably prevent a fall in temperature of the catalyst in the exhaust system.

A control apparatus for a motor vehicle according to a second exemplary embodiment of the invention includes a fuel supply detector that detects whether or not fuel supply in the vehicle has been stopped during the traveling state of the vehicle, and a controller that increases an amount of intake air in an engine if it is detected that fuel supply in the vehicle has been stopped and that retards a timing for closing exhaust valves of the engine with respect to a timing during fuel supply.

According to this embodiment, cold outside air is unlikely to enter the exhaust system including the combustion chamber. This makes it possible to prevent concentrations of exhaust emission substances from increasing due to the excessive cooling of the catalyst. In this embodiment, the amount of intake air to be introduced may be adjusted depending on an actual temperature of the catalyst.

In performing control for closing exhaust valves of the engine or control of timings for closing them, it is not necessary to control intake valves. Because the amount of intake air has been increased, the intake valves do not undergo a serious problem. However, in the case where a mechanism capable of controlling the opening and closing of the intake valves and timings for opening and closing them is provided (in many cases, a system having a mechanism for controlling exhaust valves also has a mechanism for controlling intake valves), if the intake valves are controlled to be opened (in their opening directions), pumping loss can further be suppressed.

A control method for a motor vehicle according to another exemplary embodiment of the invention includes the steps of detecting whether or not fuel supply to the engine has been stopped during a traveling state of the vehicle, detecting a temperature of a catalyst in an exhaust system, restricting flow of outside air into the exhaust system if it is detected that fuel supply in the vehicle has been stopped and that the temperature of the catalyst in the exhaust system is equal to or lower than a predetermined temperature, and permitting flow of outside air into the exhaust system if it is detected that fuel supply in the vehicle has been stopped and that the temperature of the catalyst in the exhaust system is higher than the predetermined temperature. The control method of this embodiment makes it possible to reduce pumping loss of the engine without adversely affecting concentrations of exhaust emission substances.

A control method for a motor vehicle according to another exemplary embodiment of the invention includes detecting whether or not fuel supply in the vehicle has been stopped during the traveling state of the vehicle, increasing an amount of intake air in the engine if it is detected that fuel supply in the vehicle has been stopped, and retarding a timing for losing exhaust valves of the engine with respect to a timing during fuel supply. According to this aspect, since cold outside air is unlikely to enter the exhaust system, including combustion chambers, it is possible to prevent concentrations of exhaust emission substances from increasing due to the excessive cooling of the catalyst.

BRIEF DESCRIPTION OF THE DRAWINGS

The foregoing and further objects, features and advantages of the invention will become apparent from the following description of exemplary embodiments with reference to the accompanying drawings, wherein.

DETAILED DESCRIPTION OF EXEMPLARY EMBODIMENTS

Hereinafter, various exemplary embodiments of the invention will be described in detail with reference to the drawings.

Figure 1:
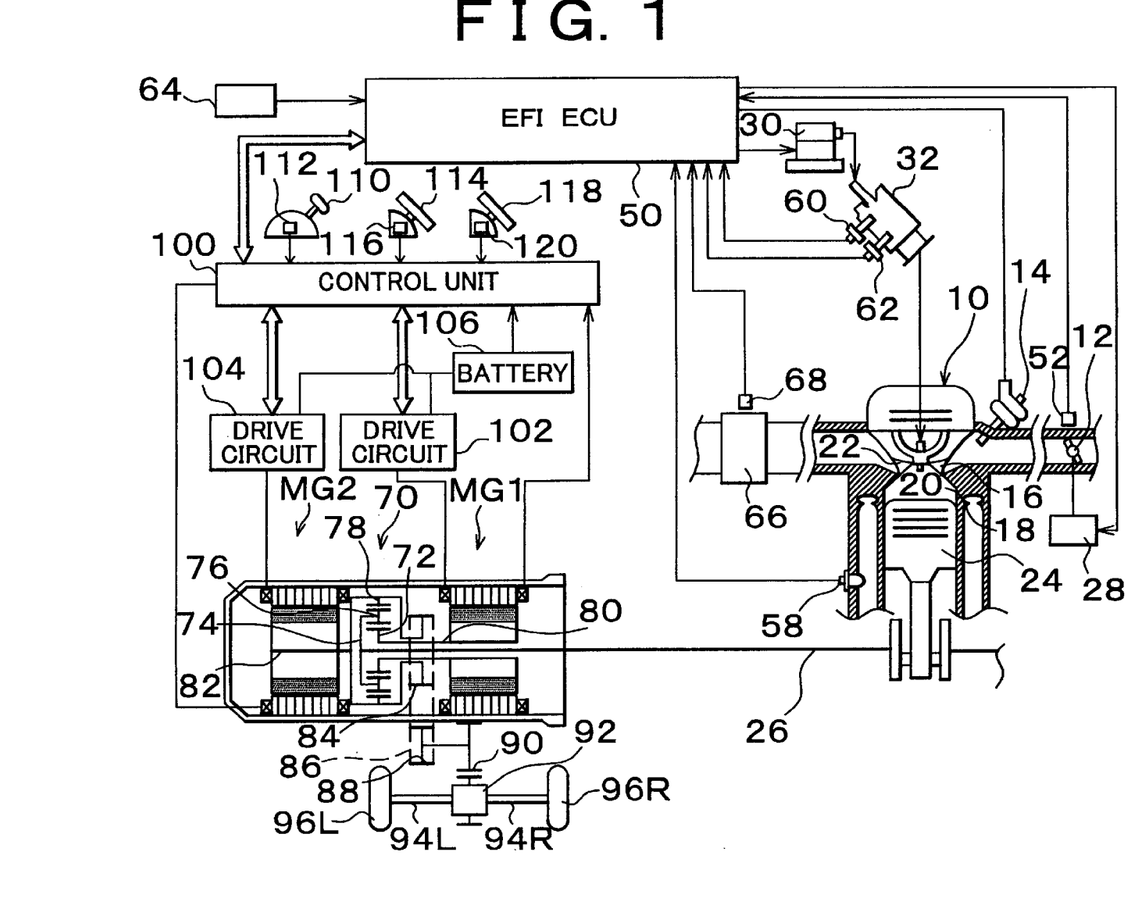
FIG. 1 is a structural view schematically showing the structure of a vehicular power transmission system to which the invention is applied.

FIG. 1 is a schematic diagram showing a vehicular power transmission system to which a control apparatus for stopping fuel supply is applied according to an exemplary embodiment of the invention. This vehicle is equipped with an engine 10 which outputs power using, for example, gasoline as fuel and with two motor generators MG1, MG2.

Air that has been sucked from an intake system through a throttle valve (a valve capable of increasing and reducing an amount of intake air) is mixed with gasoline injected from a fuel injection valve 14 and sucked into a combustion chamber 18 through an intake valve 16. The mixture that has been sucked into the combustion chamber 18 is explosively burnt by electric spark from an ignition plug 20 and discharged into an exhaust system through an exhaust valve 22. Movement of a piston 24 that is pushed down through explosion of the mixture is converted into rotational movement of a crank shaft 26.

A throttle valve 12 for adjusting the amount of intake air is driven by an actuator 28 to be opened and closed. An igniter 30 and a distributor 32 form high-voltage electric spark in the ignition plug 20.

An EFIECU 50 controls operation of the engine 10, drive control of the actuator 28 and the like. Various sensors indicative of an operating state of the engine 10 are connected to the EFIECU 50. For example, these sensors include a throttle valve position sensor 52 which detects an opening degree (a position) of the throttle valve 12, a coolant temperature sensor 58 which detects a coolant temperature of the engine 10, a rotational speed sensor 60 and a rotational angle sensor 62 which are provided in the distributor 32 to detect a rotational speed and a rotational angle of the crank shaft 26 respectively, a starter switch 64 which detects a state of an ignition key, and a catalyst temperature sensor 68 which detects a temperature of a catalyst 66 in the exhaust system.

The crank shaft 26 of the engine 10 is coupled to the first motor generator MG1 and the second motor generator MG2 through a planetary gear 70. The planetary gear 70 is composed of a sun gear 72, a planetary pinion 76 which is held by a carrier 74 and which can revolve around the sun gear 72, and a ring gear 78 with which the planetary pinion 76 meshes in an inscribed manner.

The crank shaft 26 is coupled to the carrier 74. A rotor 80 of the first motor generator MG1 is coupled to the sun gear 72. A rotor 82 of the second motor generator MG2 is coupled to the ring gear 78.

The ring gear 78, which is an output of the planetary gear 70, is coupled to a gear 84, coupled to a differential gear 92 through a chain 86 and gears 88, 90, and coupled to wheels 96L, 96R through left and right drive shafts 94L, 94R.

The first motor generator MG1 and the second motor generator MG2 are electrically connected to a battery 106 and a control unit 100 through first and second drive circuits 102, 104 into which a transistor inverter for performing switching operation and the like are built. A shift position sensor 112 provided in a shift lever 110, an accelerator sensor 116 provided in an accelerator pedal 114, a brake sensor 120 provided in a brake pedal 118 and the like are connected to the control unit 100. The control unit 100 is linked with the aforementioned EFIECU 50 and exchanges various pieces of information therewith.

Figure 2A:
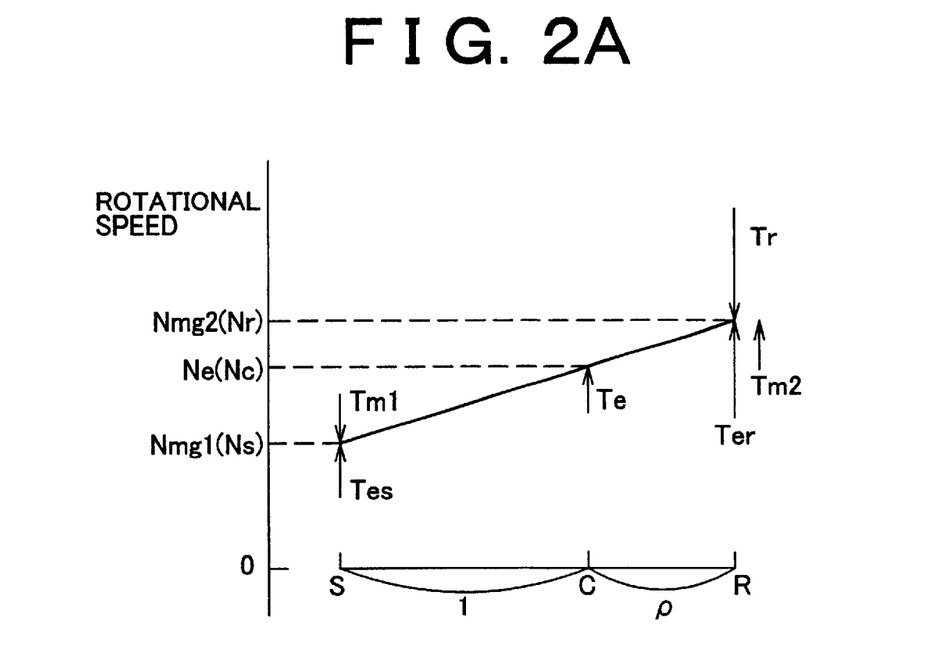
FIGS. 2A and 2B are alignment charts showing relations among inputs and outputs of a planetary gear in the power transmission system and rotational speeds of respective elements.
Figure 2B:
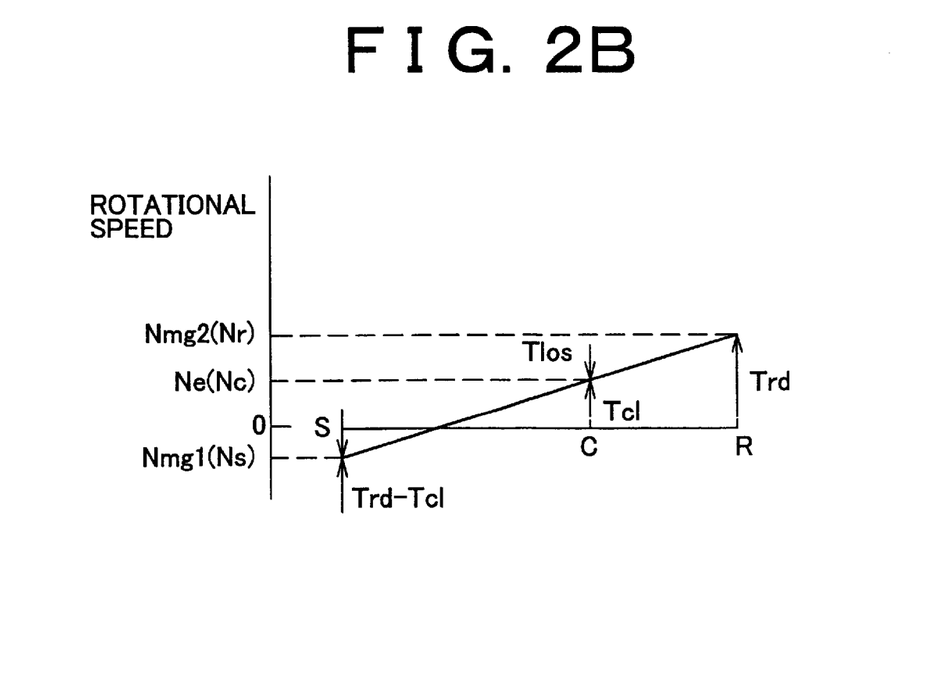

Next, operation of this power transmission system will be described. Relations among rotational speeds and torques of the respective elements of the planetary ear 70 can be understood using alignment charts as shown in FIGS. 2A and 2B. In FIGS. 2A and 2B, the axes of ordinate and abscissa are determined based on rotational speeds of the respective elements and on a ratio p of the number of teeth Zs of the sun gear to the number of teeth Zr of the ring gear (p=Zs/Zr). Using these alignment charts, torques applied to the respective elements are represented as vectorial forces which are based on their directions of application and magnitudes. Thereby it becomes possible to grasp forces or rotational speeds acting on an operational co-line.

As described above, the crank shaft 26 of the engine 10 is coupled to the carrier 74 of the planetary gear 70, the rotor 80 of the first motor generator MG1 is coupled to the sun gear 72, and the rotor 82 of the second motor generator MG2 is coupled to the ring gear 78. Accordingly, a rotational speed Nc of a coordinate C corresponding to the carrier 74 in the alignment charts corresponds to an engine speed Ne (Nc=Ne), a rotational speed Ns of a coordinate S corresponding to the sun gear 72 corresponds to a rotational speed Nmg1 of the first motor generator MG1, and a rotational speed Nr of a coordinate R corresponding to the ring gear 78 corresponds to a rotational speed Nmg2 of the second motor generator MG2. In this embodiment, since an output is taken out of the ring gear 78, a rotational speed Nr of the ring gear 78 (=Nmg2) corresponds to a vehicle speed.

As for rotational speeds, if rotational speeds of two elements of the planetary gear 70 are determined, a rotational speed of the remaining one element is uniquely determined by an operational co-line determined by the two rotational speeds.

FIG. 2A shows a state where engine outputs such as an engine speed Ne and a torque Te are inputted to the carrier 74. The torque Te is distributed to the sun gear 72 and the ring gear 78 as a torque Tes and a torque Ter respectively. The torque Tes and the torque Ter operate to increase rotational speeds of the sun gear 72 and the ring gear 78 respectively. For example, in the case where a torque Tm2 has been generated in the second motor generator MG2, the sum Tr of torques at a corresponding position (=Tm2+Ter) is outputted from the ring gear 78.

At this moment, if the power transmission system is in its equilibrium state, a torque Tm1 which is equal to a torque Tes in terms of balance is applied to the sun gear 72 as a regenerative braking load. Regenerative energy, which is represented by the product of the torque Tm1 and the rotational speed Ns, is recovered through the motor generator MG1).

In this manner, if the power transmission system is in its equilibrium state, the sum of torques applied downwards to the operational co-line to reduce a rotational speed of the corresponding element is equal to the sum of torques applied upwards to the operational co-line to increase a rotational speed of the corresponding element.

If a torque which is inputted to or outputted from one of the elements of the planetary gear 70 increases or decreases, the torque balance of the system is upset. Consequently, the vertical position and gradient of the operational co-line change, and rotational speeds of the respective elements change.

For example, as shown in FIG. 2B, consideration is given to the case where the accelerator pedal 114 (Fig. 1) is completely closed, where the torque Tm2 generated by the second motor generator MG2 is made equal to zero, where fuel supply to the engine 10 is stopped (the engine torque Te inputted to the carrier is equal to zero) and where a coasting torque Trd of the vehicle is inputted from the side of the ring gear 78. In this case, as long as the engine 10 has not been stopped (or until the engine 10 is stopped), a reaction force Tcl which measures up to a pumping loss torque Tlos of the engine 10 acts as a torque which consumes part of the thus-inputted coasting torque Trd. Thus, even if the sun gear 72 rotates at the same coasting torque Trd and the same rotational speed Nr, regenerative energy that can be taken out of the second motor generator MG2 decreases by an amount represented by the product of the engine speed Ne (=Nc) and the pumping loss torque Tlos.

For example, during stop of fuel supply (during fuel cut), with a view to minimizing pumping loss of the engine 10 (while preventing an increase in concentrations of exhaust emission substances), the following embodiments are adopted.

In a first embodiment, if the catalyst temperature sensor 68 (FIG. 1) detects during fuel cut that the temperature Tca of the catalyst 66 is higher than a predetermined temperature Tca1, the actuator 28 opens the throttle valve 12 to increase an amount of intake air. On the other hand, if the temperature Tca of the catalyst 66 has become equal to or lower than the predetermined temperature Tca1, the throttle valve 12 is then closed.

Figure 3:
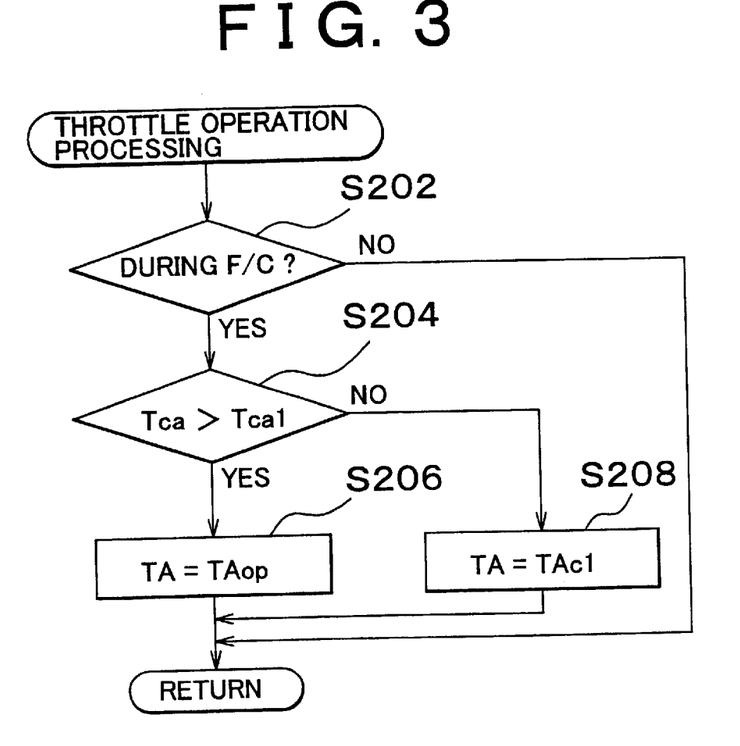
FIG. 3 is a flowchart showing a control flow for implementing a first embodiment of the invention.

FIG. 3 shows a control flow executed by the EFIECU 50 to realize this control.

It is determined in STEP 202 whether or not fuel supply has been stopped. If fuel supply has not been stopped, the problem of pumping loss does not arise. Thus, operation immediately exits the control flow.

If it is determined that fuel supply has been stopped, operation proceeds to STEP 204 where it is determined whether or not the catalyst temperature Tca is higher than the predetermined temperature Tca1. If the catalyst temperature Tca is higher than the predetermined temperature Tca1, the catalyst 66 can sufficiently perform its function. Thus, operation proceeds to STEP 206 where the opening degree TA of the throttle valve 12 is made equal to a command value TAop indicative of a substantially completely open state of the throttle valve 12. As a result, outside air can freely pass through the throttle valve 12, and therefore, pumping loss is reduced.

If it is detected that the catalyst temperature Tca is equal to or lower than the predetermined temperature Tca1, operation proceeds to STEP 208 where the opening degree TA of the throttle valve 12 is made equal to a command value TAcl indicative of a substantially completely closed state of the throttle valve 12. Thereby introduction of outside air is suppressed.

Thus, it becomes possible to reduce pumping loss of the engine 10 while reliably preventing the catalyst temperature Tca from decreasing to the extent of causing malfunction of the catalyst.

In this embodiment, the throttle valve 12 is switched between its completely open state and its completely closed state using a single set temperature Tca1 as a criterion. However, it is possible to separately set a temperature for completely opening the throttle valve 12 and a temperature for completely closing the throttle valve 12. That is, a hysteresis may be provided to open and close the throttle valve 12. In this case, the throttle valve 12 is frequently opened and closed, whereby it becomes possible to more reliably prevent generation of a shock.

In a second embodiment, during fuel cut, the opening degree TA of the throttle valve 12 is increased and set in accordance with a temperature Tca of the catalyst in the exhaust system.

Figure 4:
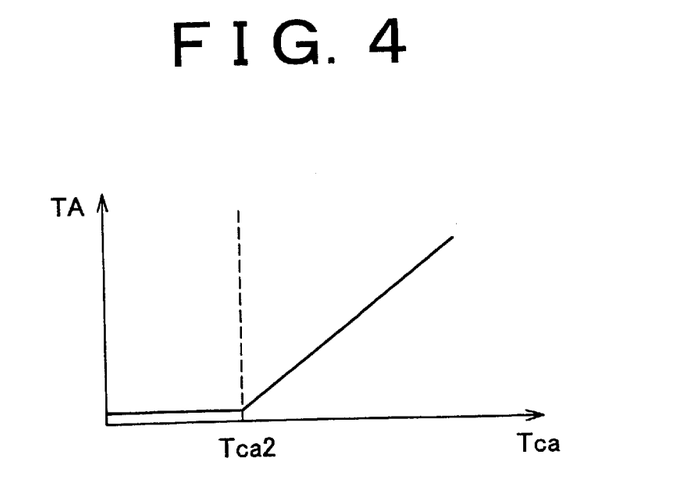
FIG. 4 is a diagram showing a relation between temperatures of a catalyst and opening degrees of a throttle valve in a second exemplary embodiment of the invention.

FIG. 4 shows an exemplary map of temperatures Tca of the catalyst stored in the EIECU 50 to realize this control and opening degrees TA of the throttle valve 12 set in accordance with the catalyst temperatures Tca.

As is apparent from FIG. 4, if the catalyst temperature Tca is lower than a predetermined temperature Tca2, the opening degree TA of the throttle valve 12 is maintained at a value corresponding to its completely closed state. If the catalyst temperature Tca drops below the predetermined temperature Tca2, it tends to be difficult for the catalyst to perform its intrinsic function. To be more specific, the predetermined temperature Tca2 is slightly lower than the predetermined temperature Tca1 of the first embodiment. As the catalyst temperature Tca becomes higher than the predetermined temperature Tca2, the throttle valve 12 is kept more widely open.

In the second embodiment, the throttle valve 12 is maintained at a specific opening degree corresponding to a temperature Tca of the catalyst. Thus, the second embodiment is advantageous in that there is no abrupt change in friction and that a shock and the like are unlikely to be generated.

It is also possible to adopt a construction for performing feedback control of the opening degree TA of the throttle valve 12 on the basis of a temperature Tca of the catalyst.

In a third embodiment, during fuel cut, the opening degree TA of the throttle valve 12 is increased and exhaust valves of the engine are driven in their closing directions in accordance with a temperature Tca of the catalyst in the exhaust system. Meanwhile, intake valves are kept open to further reduce pumping loss.

In order to realize this control, the third embodiment employs a mechanism capable of keeping the intake and exhaust valves closed and controlling them. A construction capable of freely controlling the opening and closing of the intake and exhaust valves independently of positions of pistons (without depending on positions of the pistons) is known in itself. For example, Japanese Patent Application Laid-Open No. 9-303122 discloses such a construction. In implementing the third embodiment of the invention, the structure for keeping the exhaust valves closed is not specifically limited. Here, one example of the construction will be described.

Figure 5:
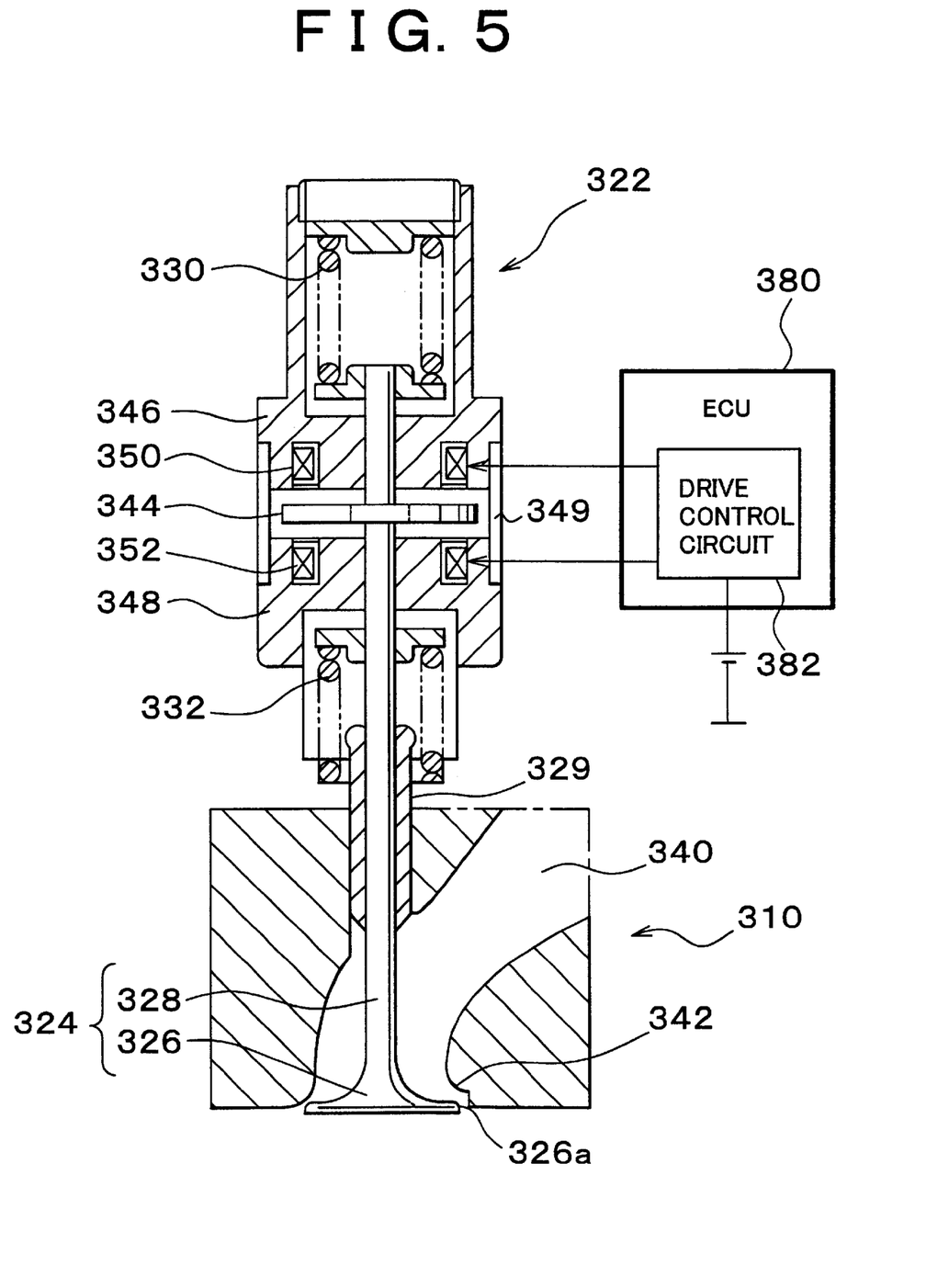
FIG. 5 is a cross-sectional view showing the structure of an exhaust valve according to a third exemplary embodiment of the invention.

FIG. 5 is a longitudinal sectional view of an electromagnetic valve which is used as an exhaust valve 322. The structure of intake valves (not shown) is completely the same as that of exhaust valves.

A valve body 324 shown in FIG. 5 includes a valve head 326 and a valve shaft 328. The valve body 324 is elastically supported by a valve guide 329, an upper spring 330 and a lower spring 332 in an axially slidable manner. A face 326a of the valve head 326 comes into or out of contact with a valve seat 342 provided in an exhaust (intake) port 340 of an engine 310. Thereby the exhaust (intake) port 340 is opened or closed.

A discoid plunger 344 formed, for example, of a soft magnetic material is secured to the valve shaft 328. An upper core 346 and a lower core 348 are disposed in the vicinity of the plunger 344 and axially spaced apart from each other by a predetermined distance. The upper core 346 and the lower core 348 are formed of a soft magnetic material and maintained in a predetermined positional relation by a case 349 formed of a non-magnetic material. An upper coil 350 is held by the upper core 346, and a lower coil 352 is held by the lower core 348.

Balance of the upper spring 330 and the lower spring 332 is set such that the position (neutral position) of the plunger 344 during stop of power supply to the upper coil 350 and the lower coil 352 becomes an intermediate position between the upper core 346 and the lower core 348. When the plunger 344 assumes the neutral position, the valve body 324 assumes an intermediate position between a completely-open-side displacement end and a completely-closed-side displacement end.

In this construction, if electric current is caused to flow through the upper coil 350, a magnetic circuit composed of the upper core 346, the plunger 344 and an air gap formed therebetween is formed around the upper coil 350, and an electromagnetic force is generated in such a direction as to displace the plunger 344 upwards. By the same token, if electric current is caused to flow through the lower coil 352. a magnetic circuit composed of the lower core 348, the plunger 344 and an air gap formed therebetween is formed, and an electromagnetic force is generated in such a direction as to displace the plunger 344 downwards.

As a result, by causing electric current to flow through the upper coil 350 or the lower coil 352, it becomes possible to axially reciprocate the plunger 344 and drive the valve body 324 integrated with the plunger 344 in its opening and closing directions at arbitrary timings. An ECU 380 determines the timings for opening and closing the valve body 324 based on signals from various sensors, and controls power supply to the upper coil 350 and the lower coil 352 by means of a drive control circuit 382.

In the third embodiment, during fuel cut, the opening degree TA of the throttle valve 12 is increased as in the aforementioned embodiments, the upper coil 350 is supplied with power in accordance with a temperature Tca of the catalyst in the exhaust system, the valve body 324 of the exhaust valve 322 is displaced upwards in FIG. 5, and the exhaust valve 322 is driven in its closing direction. On the side of the (similarly constructed) intake valve, the lower coil is supplied with power so that the intake valve is driven in its opening direction.

As a result, outside air can freely pass through the combustion chamber 18, and therefore, pumping loss of the engine 310 can be reduced. Also, since the exhaust valve 322 is suitably closed depending on a temperature Tca of the catalyst, a large amount of cold outside air enters the exhaust system to prevent an excessive decrease in catalyst temperature Tca.

If the catalyst temperature Tca is lower than a predetermined temperature Tca3, the upper coil 350 of the exhaust valve 322 is continuously supplied with power to keep the exhaust valve 322 completely closed. As the catalyst temperature Tca becomes higher than the predetermined temperature Tca3, the period for power supply (per unit time or a predetermined period) is shortened. The period for power supply is set such that the closed-valve period becomes shorter than the open-valve period.

In the third embodiment, intake valves are also constructed such that their timings can be adjusted arbitrarily. During fuel cut, the intake valves are kept open to further reduce pumping loss of the engine 310. However, since the amount of intake air has been increased, the intake valves need not be controlled to be kept open.

The construction of the third embodiment also makes it possible to prevent an excessive decrease in temperature Tca of the catalyst while minimizing pumping loss of the engine.

In a fourth embodiment, during fuel cut, the amount of intake air in the engine is increased, and the timing for closing exhaust valves is retarded with respect to the timing during fuel supply. For the same reason as in the aforementioned embodiments, the intake valves are kept open.

The fourth embodiment can also be implemented by using the (intake) exhaust valve 322 of the same type as in the third embodiment.

Figure 6:
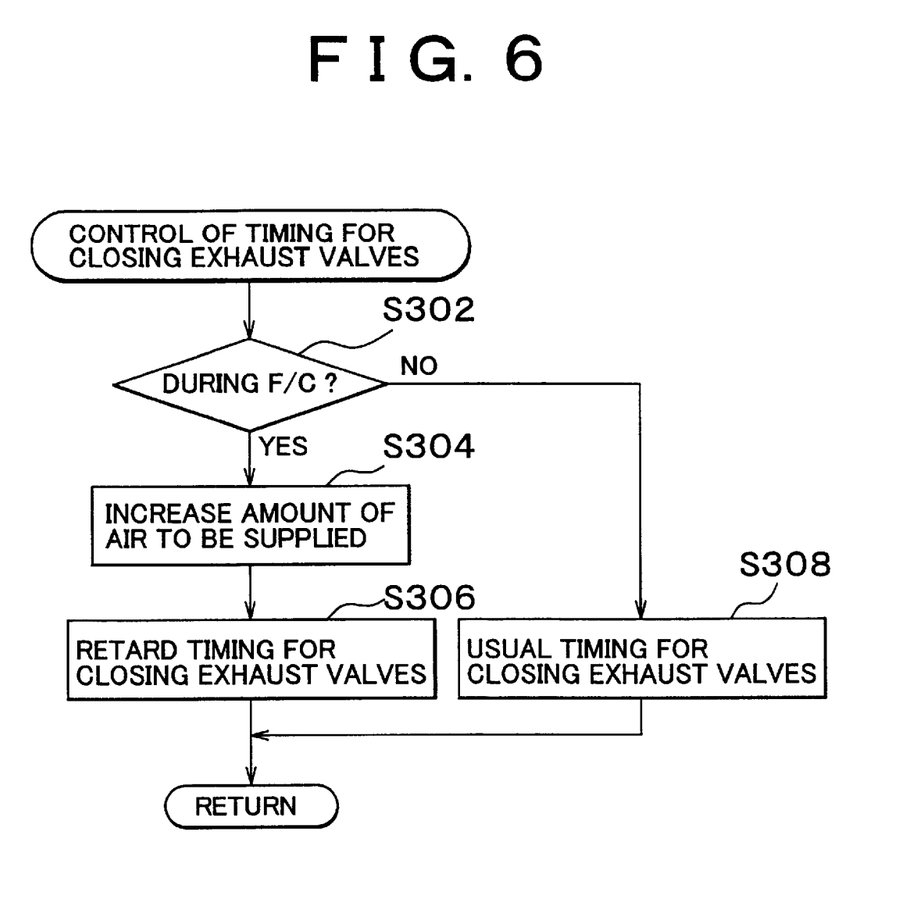
FIG. 6 is a flowchart showing a control flow for implementing a fourth exemplary embodiment of the invention.

FIG. 6 shows a control flow of the fourth embodiment.

It is determined in STEP 302 whether or not fuel supply has been stopped. If fuel supply has not been stopped, the exhaust valves are opened and closed at usual timings in STEP 308.

If it is determined that fuel supply has been stopped, operation proceeds to STEP 304 where the amount of air to be supplied to the engine is increased. In the following STEP 306, the timing for closing the exhaust valves is retarded with respect to the timing during fuel supply.

If the timing for closing the exhaust valve 322 is retarded with respect to the usual timing, air in the exhaust system that has once been discharged together with outside air in the intake system can be introduced in an intake stroke. Consequently, the thus-introduced air of a relatively high temperature is discharged in the subsequent stroke. Thus, it becomes possible to prevent a decrease in temperature of the exhaust system.

In the fourth embodiment, the timing for closing the exhaust valve 322 need not be retarded depending on the catalyst temperature Tca. Retardation of the timing for closing the exhaust valve 322 contributes not only to prevention of a decrease in temperature of the catalyst but also to reduction of pumping loss of the engine. Thus, it is acceptable to greatly retard the timing for closing the exhaust valve 322. However, in the case where intake and exhaust valves are opened and closed by means of a so-called cam shaft, the timings for opening and closing the valves can generally be retarded only in the block (e.g. Japanese Patent Application Laid-Open No. 11-117782). Thus, if the timing for closing the valves is excessively retarded, the associated timing for opening the valves may be retarded to the extent of increasing pumping loss. For this reason, it is more appropriate to retard the timing for closing the valves to a suitable extent and simultaneously set an increase in amount of intake air depending on the catalyst temperature Tca as described above.

The invention can be applied to all vehicles whether or not an exhaust gas recirculation (EGR) control system is employed. The invention provides the effect of reliably preventing concentrations of exhaust emission substances from increasing due to an excessive decrease in temperature of the catalyst in the exhaust system while minimizing pumping loss of the engine.

While the invention has been described with reference to what are presently considered to be exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. A control apparatus for a motor vehicle, comprising:
   a fuel supply detector that detects whether or not supply of fuel to an engine has been stopped during a traveling state of the vehicle;
   a temperature detector that detects a temperature of a catalyst in an exhaust system; and
   a controller that restricts flow of outside air into the exhaust system if it is detected that fuel supply in the vehicle has been stopped and that the temperature of the catalyst in the exhaust system is equal to or lower than a predetermined temperature and that causes outside air to flow into the exhaust system if it is detected that fuel supply in the vehicle has been stopped and that the catalyst temperature is higher than the predetermined temperature.

2. The control apparatus according to claim 1, wherein:
   the controller increases an amount of intake air in the engine if it is detected that fuel supply in the vehicle has been stopped and that the temperature of the catalyst in the exhaust system is higher than the predetermined temperature.

3. The control apparatus according to claim 2, wherein:
   the controller increases an amount of intake air in the engine in accordance with a temperature of the catalyst in the exhaust system if it is detected that fuel supply in the vehicle has been stopped and that the temperature of the catalyst in the exhaust system is higher than the predetermined temperature.

4. The control apparatus according to claim 1, wherein:
   the controller increases an amount of intake air in the engine in accordance with a temperature of the catalyst in the exhaust system if it is detected that fuel supply in the vehicle has been stopped and that the temperature of the catalyst in the exhaust system is higher than the predetermined temperature.

5. The control apparatus according to claim 1, wherein:

the controller increases an amount of intake air in the engine during the stop of fuel supply in the vehicle and drives exhaust valves in their closing directions in accordance with a temperature of the catalyst in the exhaust system if it is detected that the temperature of the catalyst in the exhaust system is higher than the predetermined temperature.

6. The control apparatus according to claim 5, wherein:

the controller controls to keep intake valves of the engine open if it is detected that fuel supply in the vehicle has been stopped.

7. The control apparatus according to claim 1, further comprising:

a motor-generator that drive said vehicle as one of a drive source for said vehicle and generates a regenerative energy during deceleration of said vehicle;

wherein;

the controller stops supply of fuel to the engine when the regenerative energy is generated by the motor-generator and allows air outside of the engine to be introduced to the engine.

8. A control apparatus for a motor vehicle, comprising:

a fuel supply detector that detects whether or not fuel supply in the vehicle has been stopped during the traveling state of the vehicle; and a controller that increases an amount of intake air in an engine if it is detected that fuel supply in the vehicle has been stopped and that retards a timing for closing exhaust valves of the engine with respect to a timing during fuel supply.

9. The control apparatus according to claim 8, wherein:

the controller controls to keep intake valves of the engine open if it is detected that fuel supply in the vehicle has been stopped.

10. The control apparatus according to claim 8, further comprising:

a motor-generator that drive said vehicle as one of a drive source for said vehicle and generates a regenerative energy during deceleration of said vehicle;

wherein;

the controller stops supply of fuel to the engine when the regenerative energy is generated by the motor-generator and allows air outside of the engine to be introduced to the engine.

11. A control method for a motor vehicle, comprising:

detecting whether or not fuel supply to the engine has been stopped during a traveling state of the vehicle;

detecting a temperature of a catalyst in an exhaust system;

restricting flow of outside air into the exhaust system if it is detected that fuel supply in the vehicle has been stopped and that the temperature of the catalyst in the exhaust system is equal to or lower than a predetermined temperature; and permitting flow of outside air into the exhaust system if it is detected that fuel supply in the vehicle has been stopped and that the temperature of the catalyst in the exhaust system is higher than the predetermined temperature.

12. The control method according to claim 11, wherein:

an amount of intake air in the engine is increased if it is detected that fuel supply in the vehicle has been stopped and that the temperature of the catalyst in the exhaust system is higher than the predetermined temperature.

13. The control method according to claim 12, wherein:

an amount of intake air in the engine is increased in accordance with a temperature of the catalyst in the exhaust system if it is detected that fuel supply in the vehicle has been stopped and that the temperature of the catalyst in the exhaust system is higher than the predetermined temperature.

14. The control method according to claim 12, wherein:

an amount of intake air in the engine is increased in accordance with a temperature of the catalyst in the exhaust system if it is detected that fuel supply in the vehicle has been stopped and that the temperature of the catalyst in the exhaust system is higher than the predetermined temperature.

15. The control method according to claim 12, wherein:

an amount of intake air in the engine is increased during the stop of fuel supply in the vehicle and exhaust valves are driven in their closing directions in accordance with a temperature of the catalyst in the exhaust system if it is detected that the temperature of the catalyst in the exhaust system is higher than the predetermined temperature.

16. The control method according to claim 15, wherein:

intake valves of the engine are kept open if it is detected that fuel supply in the vehicle has been stopped.

17. The control method according to claim 11, further comprising:

providing a motor-generator that drive said vehicle as one of a drive source for said vehicle and generates a regenerator energy during deceleration of said vehicle;

wherein;

supply of fuel is stopped to the engine when the regenerative energy is generated by the motor-generator and air outside of the engine is allowed to be introduced to the engine.

18. A control method for a motor vehicle, comprising:

detecting whether or not fuel supply in the vehicle has been stopped during a traveling state of the vehicle; and increasing an amount of intake air in the engine if it is detected that fuel supply in the vehicle has been stopped; and retarding a timing for closing exhaust valves of the engine with respect to a timing during fuel supply.

19. The control method according to claim 18, wherein:

intake valves of the engine are kept open if it is detected that fuel supply in the vehicle has been stopped.

20. The control method according to claim 18, further comprising:

providing a motor-generator that drive said vehicle as one of a drive source for said vehicle and generates a regenerator energy during deceleration of said vehicle;

wherein;

supply of fuel is stopped to the engine when the regenerative energy is generated by the motor-generator and air outside of the engine is allowed to be introduced to the engine.

* * * * *